United States Patent
Bugno et al.

(10) Patent No.: US 9,366,537 B2
(45) Date of Patent: Jun. 14, 2016

(54) MAGNETIC FIELD COMPENSATION SYSTEM AND METHOD THEREOF

(71) Applicant: Gentex Corporation, Zeeland, MI (US)

(72) Inventors: Mark D. Bugno; John C. Peterson, Grandville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 14 days.

(21) Appl. No.: 14/054,262

(22) Filed: Oct. 15, 2013

(65) Prior Publication Data

US 2014/0107860 A1    Apr. 17, 2014

Related U.S. Application Data

(60) Provisional application No. 61/713,882, filed on Oct. 15, 2012.

(51) Int. Cl.
*G01C 17/38* (2006.01)
*G01C 21/00* (2006.01)

(52) U.S. Cl.
CPC ............. *G01C 21/00* (2013.01); *G01C 17/38* (2013.01)

(58) Field of Classification Search
None
See application file for complete search history.

(56) References Cited

U.S. PATENT DOCUMENTS

| | | | | |
|---|---|---|---|---|
| 3,683,668 | A | | 8/1972 | Baker et al. |
| 4,733,179 | A | * | 3/1988 | Bauer et al. .................. 324/244 |
| 5,511,319 | A | * | 4/1996 | Geerlings et al. ............... 33/356 |
| 5,581,899 | A | * | 12/1996 | Brehler et al. .................. 33/356 |
| 5,632,092 | A | * | 5/1997 | Blank et al. ..................... 33/361 |
| 5,664,335 | A | * | 9/1997 | Suman et al. ................... 33/356 |
| 5,694,041 | A | | 12/1997 | Lescourret |
| 5,737,226 | A | | 4/1998 | Olson et al. |
| 5,878,370 | A | | 3/1999 | Olson |
| 6,014,610 | A | * | 1/2000 | Judge et al. ...................... 702/92 |
| 6,192,315 | B1 | * | 2/2001 | Geschke et al. ............... 701/530 |
| 6,301,794 | B1 | * | 10/2001 | Parks et al. ...................... 33/356 |
| 6,401,047 | B1 | * | 6/2002 | Voto et al. ....................... 702/92 |
| 6,418,376 | B1 | * | 7/2002 | Olson .......................... 701/495 |
| 6,427,349 | B1 | | 8/2002 | Blank et al. |
| 6,513,252 | B1 | * | 2/2003 | Schierbeek et al. ............ 33/356 |
| 6,760,678 | B1 | * | 7/2004 | Hon et al. ....................... 702/92 |

(Continued)

FOREIGN PATENT DOCUMENTS

GB    635108    4/1950

OTHER PUBLICATIONS

H. Gruben, Disturbance Compensation for an Electronic Compass Used in a Car Navigation System, Eindhoven University of Technology Department of Electrical Engineering, Jun. 14, 1993, 70 pages.

*Primary Examiner* — Rami Khatib
*Assistant Examiner* — Navid Ziaeianmehdizadeh
(74) *Attorney, Agent, or Firm* — Price Heneveld LLP; Scott P. Ryan

(57) ABSTRACT

A compass system configured to compensate for electromagnetic interference in a vehicle is provided that includes an electronic device that is sensitive to electromagnetic interference (EMI), wherein the electronic device is positioned in a vehicle such that the electronic device receives EMI from another accessory in the vehicle, and wherein the electronic device is configured to compensate for the EMI, such that the EMI field caused by the accessory can be detected and added to existing calibration point while the accessory is powered on.

20 Claims, 4 Drawing Sheets

(56) References Cited

U.S. PATENT DOCUMENTS

| | | |
|---|---|---|
| 6,956,525 B1 | 10/2005 | Chang et al. |
| 7,119,533 B2 * | 10/2006 | Tamura et al. ............... 324/202 |
| 7,346,995 B2 | 3/2008 | Olson et al. |
| 7,458,166 B2 | 12/2008 | Parks et al. |
| 7,769,539 B2 * | 8/2010 | Okeya ........................ 701/449 |
| 8,239,153 B2 | 8/2012 | Piemonte et al. |
| 8,645,093 B2 * | 2/2014 | Brunner ...................... 702/104 |
| 2003/0140510 A1 | 7/2003 | Woods et al. |
| 2003/0167121 A1 * | 9/2003 | Ockerse et al. ............... 701/224 |
| 2004/0254727 A1 * | 12/2004 | Ockerse et al. ............... 701/224 |
| 2007/0028471 A1 * | 2/2007 | Olson et al. ..................... 33/356 |
| 2007/0101596 A1 * | 5/2007 | Olson et al. ..................... 33/356 |
| 2010/0307015 A1 * | 12/2010 | Mayor et al. .................... 33/303 |
| 2011/0077889 A1 * | 3/2011 | Vogt ............................... 702/93 |
| 2013/0200882 A1 | 8/2013 | Almalki et al. |

\* cited by examiner

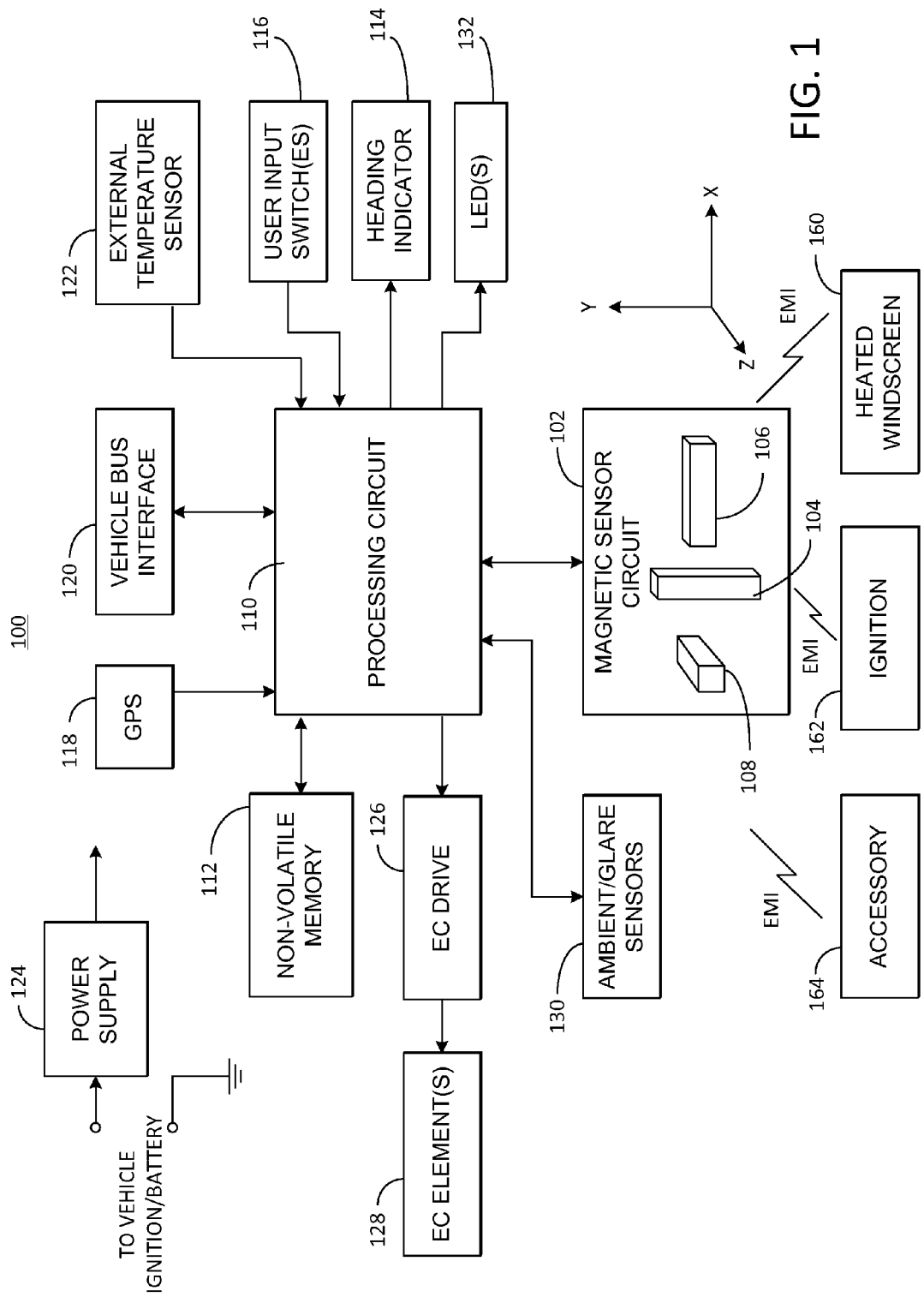

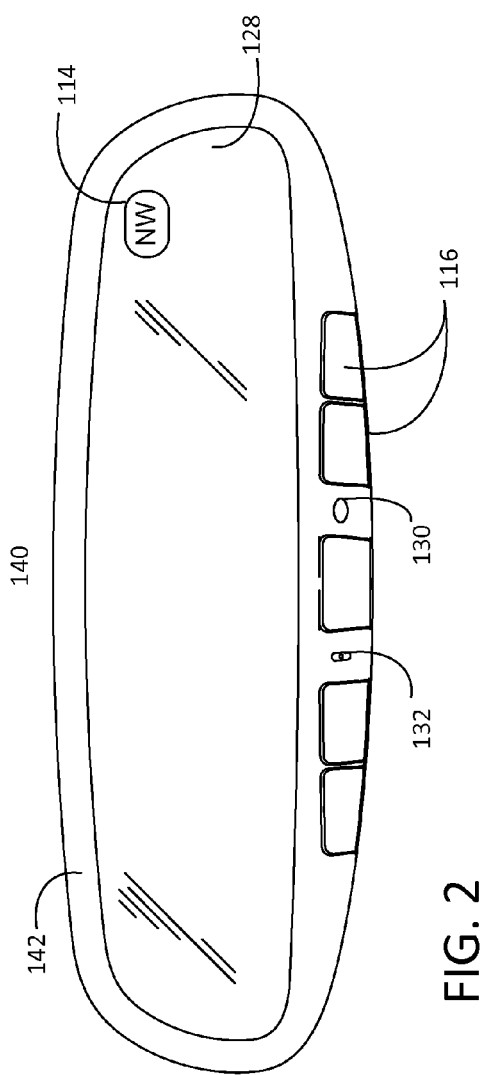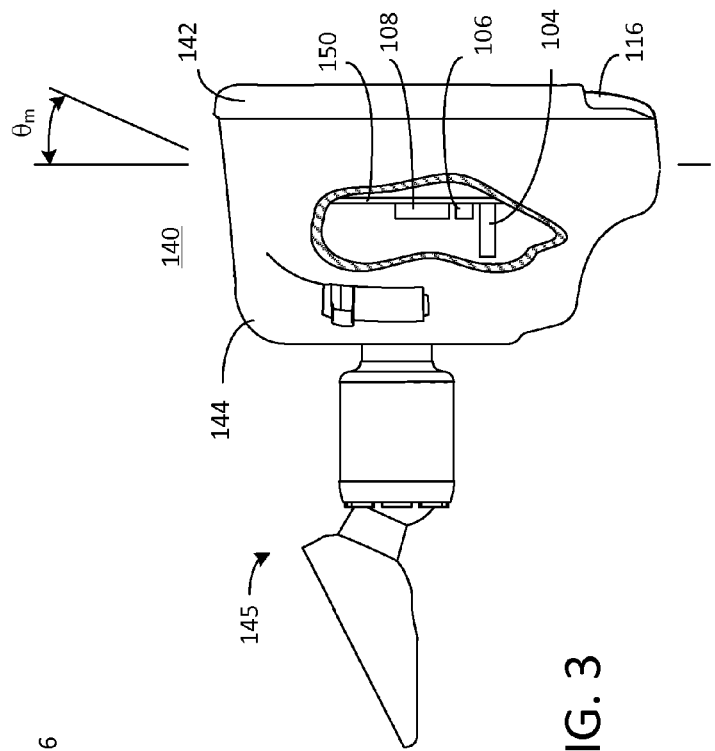

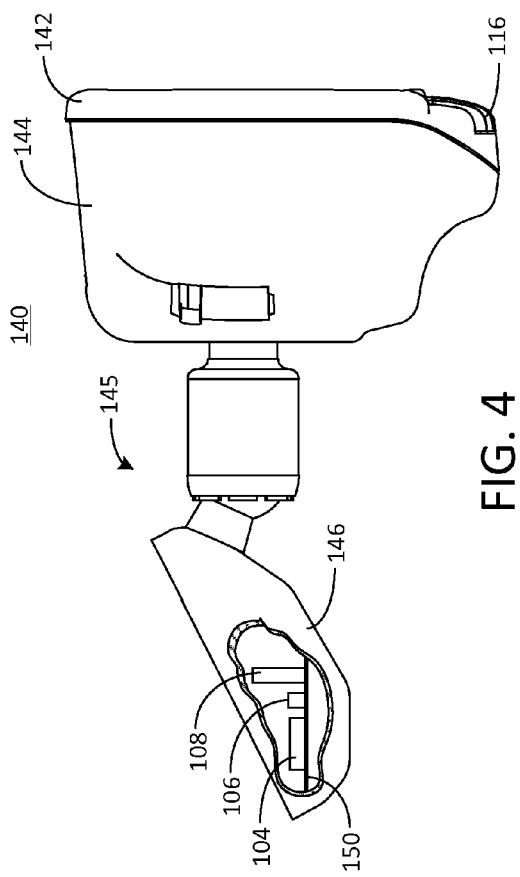
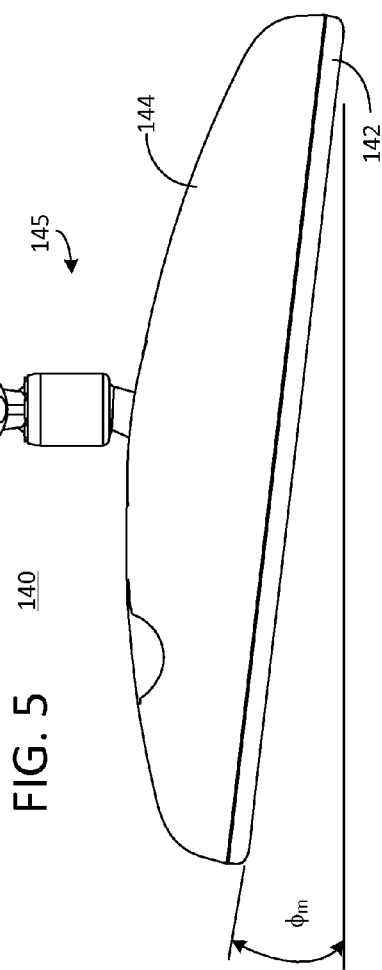
FIG. 4
FIG. 5

MAGNETIC FIELD COMPENSATION SYSTEM AND METHOD THEREOF

CROSS-REFERENCE TO RELATED APPLICATION

This application claims priority under 35 U.S.C. §119(e) upon U.S. Provisional Patent Application No. 61/713,882, entitled "MAGNETIC FIELD COMPENSATION SYSTEM AND METHOD THEREOF" filed on Oct. 15, 2012, by Mark D Bugno et al., the entire disclosure of which is incorporated herein by reference.

FIELD OF THE INVENTION

The present invention generally relates to a magnetic field compensation system and method thereof, and more particularly, a system to compensate for electrically heated windscreens and method thereof.

BACKGROUND OF THE INVENTION

Generally, vehicles have a windscreen that contains fine heater wires that are used to quickly defrost the window. These heaters can consume large amounts of current, which may generate a strong magnetic field. Other accessories such as sunroofs or convertible tops can also cause a different magnetic environment.

SUMMARY OF THE INVENTION

According to one aspect of the present invention, a compass system for a vehicle is provided comprising: the magnetic sensors mounted in the vehicle for sensing directional components of the Earth's magnetic field vector, wherein each of the magnetic sensors output signals representing a sensed component of the Earth's magnetic field along with components of any electromagnetic noise; and a processing circuit coupled to the magnetic sensors for receiving the output signals. The processing circuit being programmed to execute the steps comprising: computing a first average of the output signals, determining whether a source of electromagnetic interference has been activated, computing a first calibration point responsive to the output signals, when a source of electromagnetic interference has been activated, computing second average of the output signals acquired after activation of the source of electromagnetic interference, computing a difference between the second average of the output signals from the first average to compute an offset vector, and computing a second calibration point by offsetting the first calibration point by the offset vector, and computing a heading of the vehicle using the most recently acquired output signals and one of the first calibration point and the second calibration point and generating a heading signal indicative of the heading. The compass system further comprising a heading indicator coupled to the processing circuit for receiving the heading signal and for indicating the heading to a driver of the vehicle.

According to another embodiment of the present invention, a compass system for a vehicle is provided comprising: magnetic sensors mounted in the vehicle for sensing directional components of the Earth's magnetic field vector, wherein each of the magnetic sensors output signals representing a sensed component of the Earth's magnetic field along with components of any electromagnetic noise, the magnetic sensors including an X-axis sensor, a Y-axis sensor, and a Z-axis sensor, wherein the X- and Y-axis sensors are positioned in a generally horizontal plane with axes that are perpendicular to one another, and wherein the Z-axis sensor is positioned to sense generally vertical magnetic field components; and a processing circuit coupled to the magnetic sensors for receiving the output signals. The processing circuit being programmed to execute the steps comprising: computing a first calibration point responsive to the output signals, determining whether a source of electromagnetic interference has been activated by monitoring the output signal of the Z-axis sensor for significant variations, when a source of electromagnetic interference has been activated, computing a second calibration point by offsetting the first calibration point by an offset vector, and computing a heading of the vehicle using the most recently acquired output signals and one of the first calibration point and the second calibration point and generating a heading signal indicative of the heading. The compass system further comprising a heading indicator coupled to the processing circuit for receiving the heading signal and for indicating the heading to a driver of the vehicle.

According to another embodiment of the present invention, a compass system for a vehicle is provided comprising: magnetic sensors mounted in the vehicle for sensing directional components of the Earth's magnetic field vector, wherein each of the magnetic sensors output signals representing a sensed component of the Earth's magnetic field along with components of any electromagnetic noise; and a processing circuit coupled to the magnetic sensors for receiving the output signals. The processing circuit being programmed to execute the steps comprising: determining whether excessive noise is present in the output signals based upon a noise threshold, determining whether windshield wipers have been activated, computing a first calibration point responsive to the output signals when excessive noise is not present, when the windshield wipers have been activated, changing the noise threshold such that electromagnetic noise generated by the windshield wipers does not cause the processing circuit to determine that excessive noise is present, and computing a heading of the vehicle when excessive noise is not present using the most recently acquired output signals and the first calibration point and generating a heading signal indicative of the heading. The compass system further comprises a heading indicator coupled to the processing circuit for receiving the heading signal and for indicating the heading to a driver of the vehicle.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 1 is a block diagram of a compass system, in accordance with one embodiment of the present invention;

FIG. 2 is an elevational view of the front of a rearview mirror assembly incorporating at least a portion of the electronic compass circuit of the present invention;

FIG. 3 is an elevational view that is partially cut away of the side of a rearview mirror assembly with the magnetic sensing elements mounted within the mirror housing;

FIG. 4 is an elevational view that is partially cut away of the side of a rearview mirror assembly with the magnetic sensing elements mounted in a mounting foot of the mounting structure of the rearview mirror assembly;

FIG. 5 is a plan view showing the top of a rearview mirror assembly in which the sensing elements are mounted within the mirror housing.

DETAILED DESCRIPTION OF THE EMBODIMENTS

Figure 6:
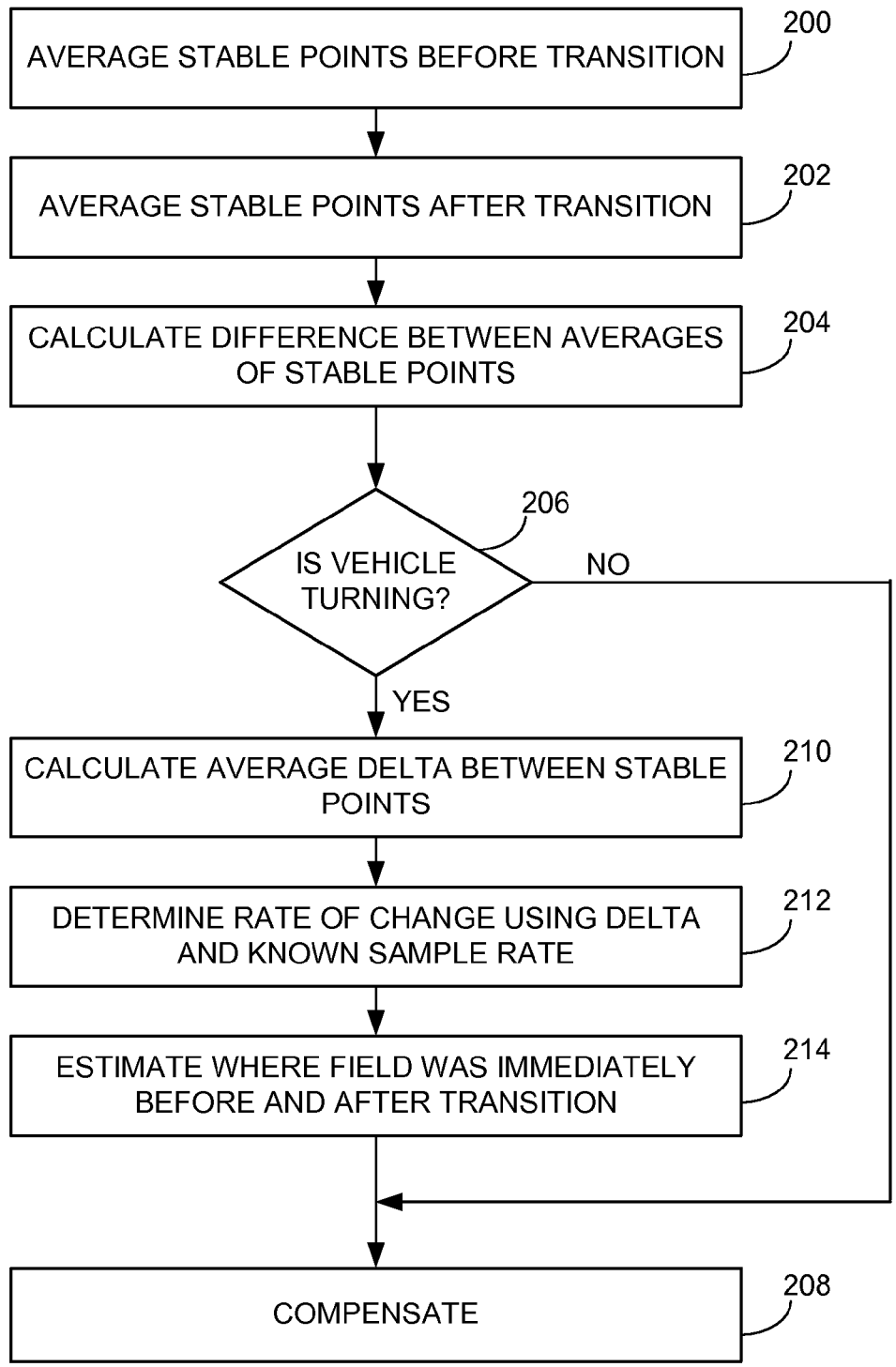
FIG. 6 is a flow chart illustrating a method of compensating for electromagnetic interference, in accordance with one embodiment of the present invention.

The present illustrated embodiments reside primarily in combinations of method steps and apparatus components related to a compensation system and method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 shows an example of an electronic compass circuit 100 constructed in accordance with embodiments described further below. Compass circuit 100 includes a magnetic sensor (i.e., magnetometer) circuit 102 having at least two sensor elements 104 and 106 for sensing perpendicular components of the Earth's magnetic field vector and for generating output signals representative of the sensed components. In some of the embodiments of the present invention, a third sensor 108 is preferably provided to sense a third perpendicular component of the Earth's magnetic field vector. Electronic compass circuit 100 further includes a processing circuit 110 that is coupled to magnetic sensor circuit 102 for receiving the output signals from sensor circuit 102.

Processing circuit 110 computes the vehicle heading as a function of the sensed components of the Earth's magnetic field vector. Processing circuit 110 also generates a heading signal representing the computed heading. This heading signal may be supplied to any other electronic component in the vehicle and is preferably supplied to a heading indicator device 114, which provides an indication of the vehicle heading to a vehicle occupant. The heading indicator may be configured to provide either a visual or an audible indication of the vehicle heading. Preferably, heading indicator 114 is a display device for visually displaying the vehicle heading. It will be appreciated, however, that the heading signals generated by the processing circuit 110 may be supplied via discrete wiring or via a vehicle bus interface 120 coupled to a bus of the vehicle to any other electrical component within the vehicle, such as a navigation system or the like. Such a navigation system could, for example, either display the heading directly or modify the orientation of a displayed map in accordance with the vehicle's current heading.

As noted above, the heading signal is preferably provided to a heading indicator 114 in the form of a display device. The display device may display the heading in alphanumerical format (i.e., N, NE, E, SE, S, SW, W, and NW). An example of a suitable display is disclosed in commonly assigned U.S. Pat. No. 6,346,698, the entire disclosure of which is incorporated herein by reference. The display disclosed in this patent displays not only the heading information, but also simultaneously displays the current external temperature as provided from an external temperature sensor 122. Alternatively, if temperature or other information is to be provided on the same display, but not simultaneously, appropriate and conventional user input switches 116 may be provided to allow the user to toggle between or selectively activate and deactivate the compass, temperature, and/or other display information.

An alternate form of display is disclosed in commonly assigned U.S. Pat. No. 6,356,376, the entire disclosure of which is incorporated herein by reference. Specifically, a graphic compass display is disclosed for providing a heading indication in graphic format. Any of the other forms of displays disclosed in this patent may alternatively be utilized, including vacuum fluorescent displays, LED displays, organic LED displays, liquid crystal displays, light emitting polymer displays, etc.

Magnetic sensor circuit 102 may be of any conventional construction modified to provide the output from additional magnetic sensor 108, where applicable. The magnetic sensor circuit may utilize flux gate, magneto-inductive, or magneto-resistive sensors. Examples of magneto-resistive sensors are disclosed in U.S. Pat. No. 5,632,092, the entire disclosure of which is incorporated herein by reference. Preferably, magnetic sensor circuit 102 is constructed in accordance with any of the embodiments disclosed in commonly assigned U.S. Pat. No. 6,653,831, the entire disclosure of which is incorporated herein by reference. It should be noted that any microprocessor circuitry utilized in the magnetic sensor circuit may be integrated with any such circuitry in processing circuit 110 and then appropriately programmed to perform all the necessary functions of both circuits. Alternatively, the microprocessor circuitry may be maintained separately.

Electronic compass circuit 110 may further include non-volatile memory 112, which may be external to processing circuit 110 or incorporated internally within one of its components. Processing circuit 110 would utilize non-volatile memory 112 for storing best fit approximating data and any other information that would need to survive between ignition cycles if the system is powered by the vehicle ignition.

Electronic compass circuit 100 may also be coupled to a global positioning system (GPS) receiver 118. The information from GPS 118 may be transmitted directly to processing circuit 110 or indirectly through the vehicle bus and bus interface 120. Information from GPS 118 or from any other positioning system, such as GLONASS or LORAN, may be utilized by processing circuit 110 for various purposes. Specifically, the information may be utilized to identify in which geographic zone the vehicle is currently traveling such that processing circuit 110 may utilize the appropriate magnetic field offset, which corresponds to the offset of the magnetic north pole from the actual North Pole as would be sensed in that particular geographic zone. Additionally, information from GPS 118 may be utilized to derive the speed of the vehicle, distance traveled, or simply whether the vehicle is currently moving. GPS information 118 may also be utilized to compute the vehicle heading and such vehicle heading may be compared to that computed using magnetic sensor circuit 102 so as to determine whether or not reapproximation or recalibration may be needed. Such use of GPS information by a compass circuit is disclosed in detail in commonly assigned U.S. Pat. Nos. 6,407,712 and 6,980,092, the entire disclosures of which are incorporated herein by reference. A system in which a LORAN receiver and/or antenna is incorporated in a rearview mirror assembly is disclosed in commonly assigned U.S. Pat. No. 6,539,306, the entire disclosure of which is incorporated herein by reference.

As noted above, processing circuit 110 may be coupled to the vehicle bus via a vehicle bus interface 120. Information provided on the vehicle bus that would be useful for processing circuit 110 would include the speed of the vehicle, distance traveled, whether the vehicle is stationary or moving, and whether the steering wheel of the vehicle is being turned. Other information that may be useful could be provided by inclinometers or other forms of roll sensors provided in the vehicle.

As shown in FIG. 1, compass circuit 110 may further include a power supply circuit 124, which is coupled to a power line from either the vehicle battery or ignition. Power supply 124 converts the power supplied from the vehicle to voltages useful for the various electronic components in the compass circuitry. In the event that the voltage from either the vehicle battery or ignition is in excess of 12 volts, a power supply circuit may be utilized such as that disclosed in commonly assigned U.S. Pat. No. 6,262,831, the entire disclosure of which is incorporated herein by reference.

As described below, all or portions of electronic compass circuit 100 are mounted on or within a rearview mirror assembly of the vehicle. It will be appreciated, however, that all or portions of compass circuit 100 may be mounted elsewhere within the vehicle, such as in an overhead console, a console mounted to the front windshield, a console on the A pillar of the vehicle, the instrument panel of the vehicle, or any other location. For example, the sensors 104, 106, and optionally 108, may be mounted on or within the rearview mirror assembly while the remainder of the compass system may be located elsewhere in the vehicle, such as in the overhead console or instrument panel. The output of the sensors may be used for other vehicle systems such as a navigation system and/or a telematics system.

FIG. 2 is a front view of a rearview mirror assembly 140 incorporating at least the heading indicator 114 in the form of an alphanumeric display. FIG. 3 shows a side view of such a rearview mirror assembly that is partially cut away to show the mounting of sensors 104, 106, and optional sensor 108 to a circuit board 150 within the mirror housing 144 of assembly 140. FIG. 4 shows a side view of rearview mirror assembly 140, but with sensors 104, 106, and 108 mounted on a circuit board 150 disposed within the mounting foot 146 of the mounting structure 145 of rearview mirror assembly 140. FIG. 5 shows a top view of the mirror assembly 140 shown in FIGS. 2 and 3. As shown in each of FIGS. 2 through 5, rearview mirror assembly 140 includes a mirror housing 144 that is pivotally coupled to a mounting structure 145, which in turn may mount to the inside of the vehicle windshield or alternatively may mount to the roof structure or headliner extending along the top of the vehicle windshield. Housing 144 includes a bezel 142, which is placed around the periphery of the front of housing 144 to hold in place a mirror element 128.

Mirror element 128 is preferably an electrochromic mirror element, which changes reflectivity in response to an applied voltage signal. As shown in FIG. 3, processing circuit 110 of compass circuit 100 may be coupled to an electrochromic (EC) drive circuit 126, which in turn provides a driving voltage to the electrochromic mirror element 128 and to any outside electrochromic mirror elements as well. Processing circuit 110 may then be programmed to be responsive to the output signals of ambient/glare sensors 130. Specifically, the glare sensor is disposed so as to sense light from the rear of the vehicle while the ambient light sensor is generally disposed on the opposite side of mirror housing 144 to sense ambient light levels in front of the vehicle. By responding to the light levels sensed by sensors 130, processing circuit 110 could then control EC drive circuit 126 and thereby control the reflectivity of electrochromic mirror element 128 as well as any outside electrochromic mirror elements. Suitable EC drive circuits are well known in the art, an example of which is disclosed in commonly assigned U.S. Pat. No. 6,247,819, the entire disclosure of which is incorporated herein by reference. The rearview mirror assembly 140 may include an appropriate user input switch 116 to allow the user to activate or deactivate automatic control of the reflectivity of the electrochromic mirror. An indicator LED 132 or the like may be provided to indicate whether the electrochromic mirror is in an automatic state.

User input switches 116 may have any form conventionally utilized on rearview mirror assemblies or on other accessories within the vehicle. Suitable constructions for user input switches are disclosed in commonly assigned U.S. Pat. Nos. 6,407,468 and 6,420,800, the entire disclosures of which are incorporated herein by reference. Another suitable construction is disclosed in commonly assigned U.S. Pat. No. 6,471,362, the entire disclosure of which is incorporated herein by reference.

As shown in FIG. 2, heading indicator display 114 may be provided behind rear element 128 with a transparent window formed in the reflective surface of mirror 128 so as to allow the heading to be viewed through the mirror. Mirror 128, however, may also be constructed to incorporate any of the features disclosed in the above-noted, commonly assigned U.S. Pat. No. 6,356,376. This patent discloses various mirror structures that allow viewing of a display positioned behind the mirror without completely eliminating the reflectivity in front of the display. It will further be appreciated that a suitable display 114 or other heading indicator may be provided on or proximate to bezel 114, on or proximate the mounting structure 145, or in an accessory proximate to or remote from rearview mirror assembly 140, such as in an instrument panel, an overhead console, or the like.

As shown in FIG. 3, magnetic sensor elements 104, 106, and 108 may be mounted to a circuit board 150 that is provided in mirror housing 144. Circuit board 150 may be vertical, horizontal, or provided in any other orientation, provided the sensors are generally oriented such that X-axis sensor 104 has its axis aligned generally in parallel with the longitudinal axis (i.e., direction of travel) of the vehicle and the Y-axis sensor 106 aligned with its axis generally horizontal and lateral with respect to the vehicle and perpendicular to the axis of X-axis sensor 106. Both X-axis and Y-axis sensors 104 and 106 are preferably aligned with their axes lying in a horizontal plane. Z-axis sensor 108, if provided, is mounted with its axis generally vertical and perpendicular to the axes of sensors 104 and 106. If the sensors are mounted in mirror housing 144, it may be preferable to provide a tilt sensor (not shown) within mirror housing 144 to sense when the mirror housing 144 and hence the sensor elements have been manually tilted, particularly if Z-axis sensor 108 is not otherwise utilized. Examples of suitable tilt sensors are disclosed in commonly assigned U.S. Pat. Nos. 6,023,229 and 6,140,933, the entire disclosures of which are incorporated herein by reference. As will be noted below, however, if Z-axis sensor 108 is provided, a tilt sensor may otherwise not be necessary.

FIG. 4 shows an alternative construction in which sensors 104, 106, and 108 are mounted within the mounting foot 146 of mounting structure 145. An advantage of mounting sensors 104, 106, and 108 in mounting foot 146 is that they will be maintained in a fixed relation with respect to the vehicle.

In FIG. 1, sources of electromagnetic interference (EMI) may produce EMI that is sensed by the magnetic sensors 104, 106, and 108. These sources of EMI, may include at least one of a heated windscreen 160, a vehicle ignition 162, and one or more accessories 164, such as a defroster, a sunroof, a convertible top, and windshield wipers.

Having described the hardware for the electronic compass system, a general overview is provided below of the inventive process to be executed by processing circuit 110. Following the general overview, a detailed description of a first embodiment illustrating one implementation of some of the inventive concepts is provided with reference to FIG. 6.

If compass sensors are placed in close proximity to an electrically-heated windscreen 160 of a vehicle, significant error or even complete locked heading can occur. In order to allow a compass to operate with the magnetic field disturbances caused by a heated windscreen, different compensation methods have been proposed. Previous implementations rely on predetermined offsets to the measurements that are applied when an accessory is activated.

Predetermined offsets can be unreliable in an automotive environment. Seemingly insignificant design changes (such as changing suppliers for components) can change wire routing, or different component placement may cause a small percentage change in the magnetic field shift. If the native shift of the windscreen or other accessory is large, this small percentage change can cause a significant compass heading error. Because a resistive heater is a non-polarized device, a manufacturer may randomly wire a connector. This causes not only the part to part variation, but the complete reversal of the expected field shift.

Predetermined offsets are also not practical when more than one vehicle type needs to be supported. A sport utility vehicle (SUV) may have a very different magnetic field shift than is seen in a compact car. Even for a given chassis type, options such as the sunroof being present or absent, or right hand/left hand drive can cause a different shift, and require the manufacturer purchase and stock a variety of preconfigured products.

Furthermore, if the compass sensors are placed in the housing of a rearview mirror, the driver selected position of the mirror relative to the windscreen can causes the field variation from the accessory to be different for each driver because of the tilting and rotation of the mirror housing and hence of the sensors relative to the vehicle's lateral and longitudinal axes.

Previous implementations have also suggested that the shift can be automatically characterized when the accessory is turned on, but have not provided specifics of a mechanism to do so. Because the magnetic field at any instant in time varies from anomalies such as travel over bridges, ignition voltage, vehicle heading change, or windshield wiper operation, simple 'before and after' field measurements are not adequate.

Commonly assigned U.S. Pat. No. 7,149,627 discloses several techniques for identifying when an accessory has been turned on and for compensating for the effects caused by operation of such an accessory. The embodiments described herein are improvements to the techniques disclosed in U.S. Pat. Nos. 7,149,627, 6,968,273, 6,023,229, and 6,140,933.

The entire disclosures of U.S. Pat. Nos. 7,149,627, 6,968,273, 6,023,229, and 6,140,933 are incorporated herein by reference.

If the field shift caused by the accessory field can be accurately found, it can be added to the existing calibration point to create a new calibration point that is accurate while the accessory is on. Improvements in accuracy of this point are available, particularly if the field shift is high.

To compensate for the change in field offset, two or more calibration data sets can be maintained. Thus, the device can be configured to determine if the most recently stored value or the newly calculated shift based calibration point is desired. When a new secondary calibration set is determined, it can be written to non-volatile memory.

A method to determine the shift caused by the vehicle accessory is to subtract the field immediately after the accessory is turned on from the field immediately before the accessory is turned on. This is generally not adequate, as the data collected in the immediate vicinity of the turn on point is generally considered unreliable for multiple reasons.

One reason is that the magnetometer may need to slew between values. This may cause the 'before' value to be partially dependent on the new value. Multiple axes are also typically sampled sequentially, and not simultaneously which may give the correct value on one axis, and not another. Furthermore, the sudden actuation of a high current accessory may momentarily disturb the vehicle ignition voltage, which may require additional time to stabilize.

FIG. 6 shows a flow chart for one embodiment of the present invention that occurs after processing circuit 110 has calculated a first calibration point and determined that a source of EMI has been activated. As shown, processing circuit 110 computes a first average of the output signals by averaging stable samples of the output signals before transition of a source of EMI to an activated state, in step 200. The average may be of a predetermined number (e.g., four) of samples that are within a predetermined distance of one another. Next in step 202, processing circuit 110 computes a second average of the output signals acquired after activation of the source of EMI by averaging stable samples of the output signals after transition of a source of EMI to an activated state. In step 204, processing circuit 110 may compute a difference between the second average of the output signals from the first average to compute an offset vector. In step 206, processing circuit 110 may determine if the vehicle is turning based upon any one of a number of factors. For example, input from a steering wheel angle sensor may be used, or if any of the sample data points of the output signals preceding activation of the EMI source were spaced apart by a distance that exceeded a threshold, processing circuit 110 may determine that the vehicle is turning.

If the vehicle is not turning, processing circuit 110 may perform compensation as depicted in step 208. Such compensation may include computing a second calibration point by offsetting the first calibration point by the offset vector. The processing circuit may then compute a heading of the vehicle using the most recently acquired output signals and one of the first calibration point and the second calibration point and generate a heading signal indicative of the heading.

If the vehicle is turning, processing circuit 110 will, in step 210, calculate the average delta between sample points. From this delta, processing circuit 110 can determine a rate of change using the delta and a known sample rate in step 212. From the rate of change, processing circuit 110 can estimate where the magnetic field was immediately before and after the transition of the EMI source to an activated state in step 214, and then compensate in step 208 using the estimate computed in step 214.

By using an average of the most recent stable points before the transition, and the average of the most recent stable points after the transition, the data in the vicinity of the transition is ignored. Some of the uncertainty in the shift measurement is therefore removed. This may cause a different error if the vehicle is turning while the accessory is being turned on. The deletion of data at turn on causes a difference in time of the samples, and therefore a different heading between the before and after fields.

Additionally, the status of accessories can be included. Accessories such as windshield wipers, blower motors, power window motors, can add uncertainty to magnetic measurements. Their on/off status, or power level can be used to contribute to a total noise/uncertainty score.

As ignition voltage determines the amplitude of the magnetic shift from the windscreen, sudden change in voltage can cause an uncertainty in the magnetic measurement. Measuring the noise level of the ignition signal can also be used to contribute to the total noise/uncertainty score.

Typically, characterizations of the intensity of noise are based on rate of change of the data. If however the vehicle is making a slow turn, the change in heading will contribute to the rate of change of the data which is measured by the magnetometer. As a compensation method for changing data while turning is known, this change in field contribution from heading change should not be weighted the same as other transient noise sources.

As rate of turn of the vehicle does not normally change quickly, the trend of previous samples can be used to find an expected new value. This expected value can then be compared to the most recent measurement to calculate noise.

Many vehicles contain steering angle sensors which send data over a vehicle bus. This can be used to lower the contribution of the noise to the uncertainty score. Speed information can be combined with steering wheel data to predict rate of heading change, and then with circle radius to get an expected rate of change of data.

According to one embodiment, a method to better determine the uncertainty of the data while turning is to watch the Z-axis magnetic field noise. When the compass includes three magnetic sensors as disclosed in U.S. Pat. Nos. 7,149,627 and 6,968,273, the three sensors include an X-axis sensor, a Y-axis sensor, and a Z-axis sensor, wherein the X-axis and Y-axis sensors are positioned in a generally horizontal plane with axes that are perpendicular to one another, and wherein the Z-axis sensor is positioned to sense generally vertical magnetic field components. If a vehicle is turning on a relatively flat surface, the Z-axis field would be expected to be reasonably stable. Any significantly varying signal in the Z-axis would therefore indicate a noisy environment. The Z-axis noise can therefore be weighted higher than the X-axis/Y-axis when determining a level uncertainty in the data acquired from the sensors.

The amount of time to get a stable, low noise reading can also be useful as a measurement of uncertainty. It is advisable to have a timeout while waiting for stable data. Hitting the timeout can be interpreted as extremely unreliable data, which forces the system to use the stored calibration point.

By way of explanation and not limitation, as the defroster may not be used at all during the summer months, a stored secondary calibration point may no longer be accurate in the fall when the defroster is turned on for the first time. This can result in a lower confidence in the stored solution than the newly calculated solution. The number of ignition cycles since last calibration point store is one way to estimate the age of a calibration point. A high ignition count would increase the confidence in the new point instead of decreasing it as most factors do.

As the uncertainty calculations can return a variable answer, they may be used with a threshold to decide if the new calculated shift should be used, or if the original stored value is more reliable. The uncertainty calculation can also be used to form a weighted shift for a new calibration point. For example, the new point could be for example 80% based on the new point, and 20% based on the old point if the confidence in the newly calculated calibration is high (i.e., the uncertainty is low).

Since there can be some uncertainty in the newly selected calibration point, the compass system can enter a fast learn mode after shift. For example, this can be a shift in the thresholds of maximum noise allowed to learn new 'bucket points'. Again, having a variable point based system to estimate the confidence in data would allow a variable number of learned buckets to be discarded, wherein the oldest can be discarded first.

As the windscreen is essentially a large electromagnet, it is likely that the metal surrounding the windscreen will be slightly magnetized when the windscreen is cycled. This can cause the original calibration point to no longer be accurate when the windscreen is turned off. To correct for this, one or more methods may be used.

One method is to enter fast learn mode when returning to the original calibration point.

This typically includes discarding data that has been accumulated that has not yet been sufficient to be used to derive a new calibration point. Another method is to use the reverse field shift, as described above when the accessory is turned off. This time however, the calibration point used while the accessory is in the on state would be adjusted based on the shift in field from when the accessory is on, to the field after the accessory is turned off. Yet another method is to use an average of the stored and newly calculated calibration point, or a weighted average based on shift data confidence.

Regarding the method of using the reverse field shift, processing circuit 110 may compute a third average of the output signals while the source is still activated and determine whether a source of electromagnetic interference has been deactivated. When a source of electromagnetic interference has been deactivated, processing circuit 110 computes a fourth average of the output signals acquired after deactivation of the source of electromagnetic interference, computes a difference between the third average of the output signals from the fourth average to compute a second offset vector, and computing a third calibration point by offsetting the second calibration point by the second offset vector. The processing circuit then computes a heading of the vehicle using the most recently acquired output signals and one of the second calibration point and the third calibration point and generates a heading signal indicative of the heading.

According to one embodiment, to compensate for an accessory 'on' or 'off' shift is to compare the new shift based point to the original point, and only adjust if the difference is large enough. This can eliminate error that can accumulate if multiple cycles are seen in a short period of time.

Detecting that an accessory has been activated can be done multiple ways. For example, in a hardwired environment, it may be adequate to measure the magnetic field approximately 100 ms before the activation, and approximately 100 ms after. The field shift value can be monitored with expected characteristics of the accessory. This is to be tolerant of issues such as transients on the signal lines, device failures such as cracked windscreens, or the like.

For purposes of explanation and not limitation, a requirement could be that the vector has a magnitude of at least approximately 400 mG. The sign and direction could also be used as part of the requirement. It may also be necessary to include the vector in the opposite direction, as devices such as windscreen heaters are typically non-polarized devices, and may be wired differently vehicle to vehicle. Requirements may also be loaded from a table based on a bus based signal that identifies the key characteristics of the vehicle such as right/left hand drive, car or SUV, etc.

In the event of a bus based system, measuring the before and after fields becomes more complicated. As bus based designs typically have inherent latencies, the signal that the accessory is on may come before or after the actual actuation time. The difference may be small, but if not taken into account, a transition can be incorrectly measured. For this reason, it can be advantageous to record any transition that matches the desired criteria, and record a time stamp. Similarly, the notification signal should record a time stamp, and should be compared to the transition to make sure the activation is legitimate. For example, both events should occur within one half second. Items such as relay pull-in times at low voltages should also be taken into consideration. This applies to a hard-wired application as well.

Another indicator of the noise signature of the accessory can be the ignition voltage. It is common for the ignition voltage to dip momentarily as a high current load is switched in.

One source of magnetic noise is the windshield wipers. This noise may be worse for a vehicle with a heated windscreen than a vehicle with a conventional defroster. This is because the magnetic field from the windscreen may actually magnetize the metal in the wiper arms. The metal arms can also channel the field from the windscreen, and aim it toward or away from the compass sensor, depending upon the position in the cycle.

This wiper noise generally affects all three axes of the compass sensor. This can be useful for differentiating the presence of a noise source from the normal variation in magnetic field caused by the vehicle turning. The Z-axis field measured by the magnetometer will be the sum of the Earth's vertical field, the vertical field of the metal in the vehicle, the vertical field of the windscreen, and the vertical field of any noise present. If the vehicle remains level, the Z-axis component of the Earth's field will be constant. As most roads are generally level (or at least gradually changing in slope), the Z-axis field will remain reasonably stable while turning, and most of the variation will be in the X and Y axes. Variation in the X and Y axes with only a small change in the Z-axis can be used to detect the magnetic field shift, where the presence of Z-axis noise implies that the field shift may not be reliably characterized.

By way of explanation and not limitation, a single high current accessory is described. It is also possible to support multiple accessories, each with their own noise signature and calibration points. When multiple accessories are on simultaneously, an additional calibration point can be used to store data for this condition.

Although a heated windscreen is described, slow turn on accessories such as blower motors, or convertible tops and sunroofs may be supported with similar methods.

For a blower motor, the ramp up time can be considered a noisy interval, and the delta field would be found after stable speed. Longer averaging is needed on the ignition voltage measurement to compensate for the slow ramp of the motor speed caused by rotational inertia.

Convertible tops and sunroofs can also be supported with this method by again treating the transition time of the accessory as 'noisy.'

According to one embodiment, a bus based signal (or other connection method) may be used to identify sources of noise, or information that can be used to measure confidence in the quality of a measurement.

This accessory state can also be used to shift noise thresholds. For example, the noise thresholds used for normal operation may cause the system to be in a continuous 'noisy' state when the wipers are on their highest setting. While this can increase accuracy while the wipers are off, it may not be desirable to lock the displayed heading when the wipers are on high. The wiper status signal can therefore be used to select a different noise threshold when the wipers are on high, allowing a heading to be displayed while the wipers are on, without compromising the normal wiper off accuracy.

The interfering source can also be used to reduce the likelihood of learning a new calibration point for the master set. An example of this would be to avoid learning a new calibration point if the sunroof is open, or if the rear defroster is on.

Wipers on high can also be used to set the confidence level used by field shift calculations as described above to a low value, shifting priority of the solution to the stored point.

According to an alternate embodiment, a bus based signal may be substituted with hard wired solutions.

Battery voltage can also affect the magnetic field measured by the compass while a high current accessory is on. If the field generated by the accessory is high, then it is likely that compensation will be needed. For example, if an accessory shifts the magnetic field by approximately 1000 mG with an approximately 13.8V supply, it may only generate a field approximately represented by 12.8V÷13.8V*1000 mG=928 mG if the ignition voltage drops to approximately 12.8V. This approximately 72 mG variation can cause an undesirable heading error. In a region of the world where the earth's horizontal magnetic field is approximately 200 mG, the heading error would be the arctangent, which is approximately represented by 72 mG÷200 mG=19.8 degrees. The error will be worse as one is closer to the earth's poles where the earth's horizontal component is smaller, and less if one is closer to the equator where the horizontal component is larger.

Accurately measuring the magnetic field immediately before and after the accessory is actuated is complicated by this voltage sensitivity. The voltage may be shifting while a measurement is being made due to acceleration.

For enhanced performance, the ignition voltage can be recorded with each magnetic sample. As the delta from the original accessory-off condition is known, voltage compensation may be performed because the shift is proportional to the voltage. The voltage at accessory-on can be recorded and scaled based on a nominal voltage such as approximately 13.8V. Readings while the accessory is on can then be offset based on the current voltage compared with approximately 13.8V, and the original shift value.

In addition to improving the performance of the compass with varying accessory status, similar methods can be used to compensate for the field change that is associated with repositioning the mirror by the driver when the sensors are positioned in the mirror housing. A heavily magnetized vehicle can cause a significant error when the mirror is tilted. It is also possible to specify a minimum vector shift, without a position sensor.

It will be appreciated that embodiments of the invention described herein may be comprised of one or more conventional processors and unique stored program instructions that control one or more processors to implement, in conjunction with certain non-processor circuits, some, most, or all of the functions of a compensation system and method thereof, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A compass system for a vehicle comprising:
    magnetic sensors mounted in the vehicle for sensing directional components of the Earth's magnetic field vector, wherein each of said magnetic sensors output signals representing a sensed component of the Earth's magnetic field along with components of any electromagnetic noise;
    a processing circuit coupled to said magnetic sensors for receiving the output signals, said processing circuit being programmed to execute the steps comprising:
        computing a first average of the output signals,
        determining whether a source of electromagnetic interference is activated,
        computing a first calibration point responsive to the output signals,
        while a source of electromagnetic interference is activated, computing second average of the output signals acquired after activation of the source of electromagnetic interference, computing a difference between the second average of the output signals from the first average to compute an offset vector, and computing a second calibration point by offsetting the first calibration point by the offset vector, and
        computing a heading of the vehicle using the most recently acquired output signals and one of the first calibration point and the second calibration point and generating a heading signal indicative of the heading; and
    a heading indicator coupled to said processing circuit for receiving the heading signal and for indicating the heading to a driver of the vehicle.

2. The compass system of claim 1, wherein said processing circuit determines whether a source of electromagnetic interference has been activated by sensing a noise signature in the output signals of said magnetic sensors.

3. The compass system of claim 2, wherein:
    said magnetic sensors including an X-axis sensor, a Y-axis sensor, and a Z-axis sensor, wherein the X- and Y-axis sensors are positioned in a generally horizontal plane with axes that are perpendicular to one another, and wherein the Z-axis sensor is positioned to sense generally vertical magnetic field components; and
    wherein said processing circuit determines whether a source of electromagnetic interference has been activated by monitoring the output signal of said Z-axis sensor for variations.

4. The compass system of claim 1, wherein said processing circuit determines whether a source of electromagnetic interference has been activated by receiving an electrical signal indicating that the source has been activated.

5. The compass system of claim 1, wherein said processing circuit is configured to receive a signal from a steering wheel angle sensor, wherein, when a source of electromagnetic interference has been activated, said processing circuit estimates an extent of turning of the vehicle from the signal from the steering wheel sensor during a period from a time when the source of electromagnetic interference has been activated to a time when the second average has been computed, and wherein said processing circuit computes an estimated change in vehicle heading as a result of turning of the vehicle and computes the second calibration point taking into account the estimated change in vehicle heading.

6. The compass system of claim 1, wherein, when said processing circuit determines that a source of electromagnetic interference is no longer activated, said processing circuit executes the steps comprising:
    computing a third average of the output signals while the source is still activated,
    determining whether a source of electromagnetic interference has been deactivated,
    when a source of electromagnetic interference has been deactivated, computing a fourth average of the output signals acquired after deactivation of the source of electromagnetic interference, computing a difference between the third average of the output signals from the fourth average to compute a second offset vector, and computing a third calibration point by offsetting the second calibration point by the second offset vector, and
    computing a heading of the vehicle using the most recently acquired output signals and one of the second calibration point and the third calibration point and generating a heading signal indicative of the heading.

7. The compass system of claim 1, wherein the source of noise is at least one of a heated windscreen, a defroster, a sunroof, a convertible top, and windshield wipers.

8. The compass system of claim 1, wherein said magnetic sensors are housed within a rearview device of the vehicle.

9. The compass system of claim 8, wherein said rearview device is an electrochromic rearview mirror assembly.

10. The compass system of claim 1, wherein said processing circuit computes the heading of the vehicle using the second calibration point when a source of electromagnetic interference has been activated and when a confidence level in the second calibration point is high.

11. The compass system of claim 1, wherein said processing circuit computes the first and second averages using a predetermined number of samples of the output signals within a predetermined distance of one another.

12. The compass system of claim 11, wherein said processing circuit determines if samples to be averaged to compute the first average are spaced apart by a distance that exceeds a threshold distance, and if the samples to be averaged exceed the threshold distance, said processing circuit does not use the second average of the output signals, but rather determines a rate of change of the output signals to estimate an expected change in output signals after the source of electromagnetic interference has activated so as to compute the offset vector.

13. The compass system of claim 1, wherein said processing circuit determines whether excessive noise is present in the output signals based upon a noise threshold, and when excessive noise is present, said processing circuit does not compute a second calibration point, and computes a heading of the vehicle using the first calibration point.

14. A compass system for a vehicle comprising:
   magnetic sensors mounted in the vehicle for sensing directional components of the Earth's magnetic field vector, wherein each of said magnetic sensors output signals representing a sensed component of the Earth's magnetic field along with components of any electromagnetic noise, said magnetic sensors including an X-axis sensor, a Y-axis sensor, and a Z-axis sensor, wherein the X- and Y-axis sensors are positioned in a generally horizontal plane with axes that are perpendicular to one another, and wherein the Z-axis sensor is positioned to sense generally vertical magnetic field components;
   a processing circuit coupled to said magnetic sensors for receiving the output signals, said processing circuit being programmed to execute the steps comprising:
      computing a first calibration point responsive to the output signals,
      determining whether a source of electromagnetic interference is activated by monitoring the output signal of said Z-axis sensor for variations,
      while a source of electromagnetic interference is activated, computing a second calibration point by offsetting the first calibration point by an offset vector, and
      computing a heading of the vehicle using the most recently acquired output signals and one of the first calibration point and the second calibration point and generating a heading signal indicative of the heading; and
   a heading indicator coupled to said processing circuit for receiving the heading signal and for indicating the heading to a driver of the vehicle.

15. The compass system of claim 14, wherein said processing circuit further executes the steps of:
   determining whether excessive noise is present in the output signals based upon a noise threshold,
   determining whether windshield wipers have been activated, wherein said processing circuit computes the first calibration point responsive to the output signals when excessive noise is not present,
   when the windshield wipers have been activated, changing the noise threshold such that electromagnetic noise generated by the windshield wipers does not cause said processing circuit to determine that excessive noise is present, wherein said processing circuit computes the heading of the vehicle when excessive noise is not present.

16. The compass system of claim 14, wherein said processing circuit further executes the steps of:
   computing a first average of the output signals; and
   when a source of electromagnetic interference has been activated, computing second average of the output signals, computing a difference between the second average of the output signals from the first average to compute the offset vector, and computing the second calibration point by offsetting the first calibration point by the offset vector.

17. The compass system of claim 14, wherein said processing circuit computes the heading of the vehicle using the second calibration point when a source of electromagnetic interference has been activated and when a confidence level in the second calibration point is high.

18. A compass system for a vehicle comprising:
   magnetic sensors mounted in the vehicle for sensing directional components of the Earth's magnetic field vector, wherein each of said magnetic sensors output signals representing a sensed component of the Earth's magnetic field along with components of any electromagnetic noise;
   a processing circuit coupled to said magnetic sensors for receiving the output signals, said processing circuit being programmed to execute the steps comprising:
      determining whether excessive noise is present in the output signals based upon a noise threshold,
      determining whether windshield wipers have been activated,
      computing a first calibration point responsive to the output signals when excessive noise is not present,
      when the windshield wipers have been activated, changing the noise threshold such that electromagnetic noise generated by the windshield wipers does not cause said processing circuit to determine that excessive noise is present, and
      computing a heading of the vehicle when excessive noise is not present using the most recently acquired output signals and the first calibration point and generating a heading signal indicative of the heading; and
   a heading indicator coupled to said processing circuit for receiving the heading signal and for indicating the heading to a driver of the vehicle.

19. The compass system of claim 18, wherein:
   said magnetic sensors including an X-axis sensor, a Y-axis sensor, and a Z-axis sensor, wherein the X- and Y-axis sensors are positioned in a generally horizontal plane with axes that are perpendicular to one another, and wherein the Z-axis sensor is positioned to sense generally vertical magnetic field components; and
   wherein said processing circuit determines whether the windshield wipers have been activated by monitoring the output signal of said Z-axis sensor for variations.

20. The compass system of claim 18, wherein said processing circuit determines a setting at which the windshield wipers are activated and changes the noise threshold only when the windshield wipers are activated at their highest setting.

* * * * *